Feb. 21, 1933.                L. J. McDONALD                1,898,059
                         SECURING MEANS FOR SPECTACLES
                              Filed Aug. 6, 1931

Inventor
L. J. McDonald
By Watson E. Coleman
Attorney

Patented Feb. 21, 1933

1,898,059

UNITED STATES PATENT OFFICE

LELAND J. McDONALD, OF PAWHUSKA, OKLAHOMA

SECURING MEANS FOR SPECTACLES

Application filed August 6, 1931. Serial No. 555,571.

This invention relates to holding or securing devices and pertains particularly to a holding means for spectacles.

The primary object of the present invention is to provide a means whereby spectacles, out of the usual carrying case, may be secured in a pocket as for example, in the breast pocket of a shirt, so that they will not be lost therefrom when the pocket is inverted.

The invention broadly contemplates the provision of a resilient clasp or finger device attached to a temple bar of a pair of spectacles. This clasp device is arranged to extend longitudinally of the temple bar upon the outer side thereof and is secured at one end adjacent the hinge of the bar so that when the temple bars are folded over the spectacle frame and the spectacles placed in a pocket the clasp device will engage over the edge of the pocket and thus securely hold the spectacles in place.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1:
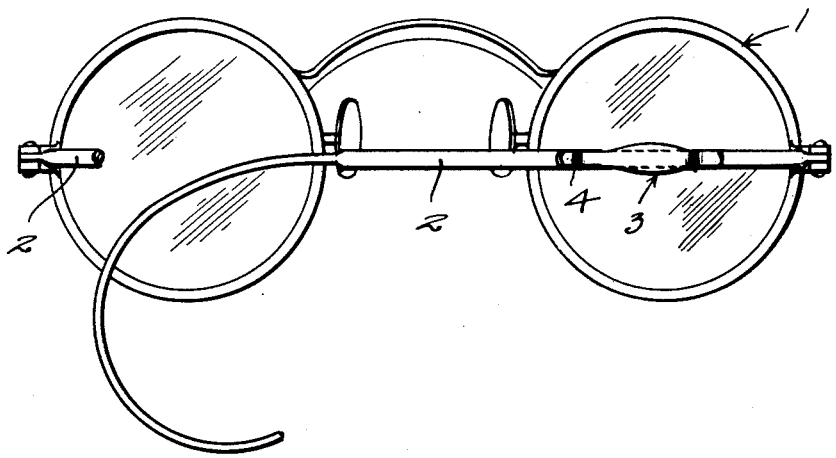
Figure 1 is a view in plan of a pair of spectacles with the temple bars folded, one of the bars being broken, showing the device embodying the present invention applied to the unbroken bar.
Figure 2:
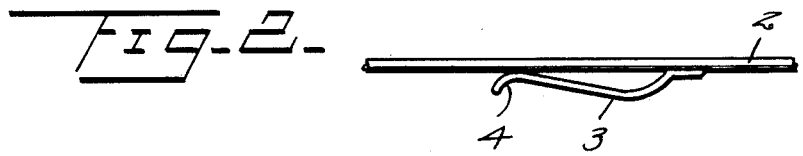
Figure 2 is a fragmentary view of the clasp carrying bar showing the clasp in side elevation.

Referring more particularly to the drawing wherein like numerals of reference indicate corresponding parts throughout the several views, the numeral 1 indicates generally a pair of spectacles to the sides of which are hinged the usual temple bars 2.

In carrying out the present invention one of the temple bars has secured to the outer side thereof, adjacent its hinge connection with the frame, one end of the elongated resilient clasp finger 3. This finger 3 extends longitudinally of the bar as shown, the free end thereof being directed toward the free end of the temple bar. Between the free end of the clasp finger and the attached end thereof, the body portion is curved outwardly away from the temple bar so that when the tip or free end 4 is slipped over the top edge of a pocket ample room will be provided between the temple bar and the clasp finger for the pocket seam.

The free end 4 of the clasp finger will normally engage beneath the pocket seam and will thus firmly grip the pocket and hold the spectacles in place therein. It will, of course, be obvious that the spectacles are folded up when they are placed in the pocket and the temple bar carrying the clasp finger will overlie the other temple bar.

Figure 3:
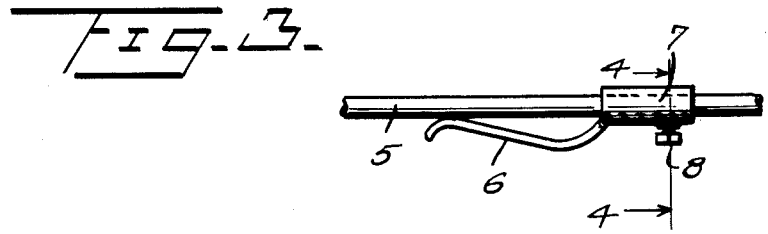
Figure 3 is a view showing a modified form of clasp.
Figure 4:
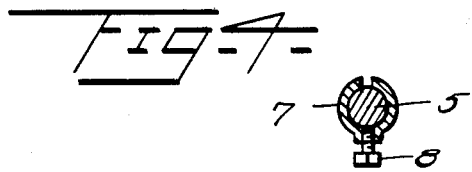
Figure 4 is a sectional view taken on the line 4—4 of Figure 3.

While in Figure 1 the pocket engaging finger has been shown as permanently attached at one end to the temple bar it will be obvious that other means may be employed for securing the clasp finger to the bar and one other means is illustrated in Figures 3 and 4.

In the forms of clasp fingers shown in Figures 3 and 4 the finger is designed primarily for attachment to the relatively large round temple bars of tortoise rim spectacles. Such a bar is indicated by the numeral 5. In this form the resilient clasp finger, which is indicated by the numeral 6, forms an integral extension of one end of a longitudinally split sleeve 7 which is closed tightly about the temple bar in the manner shown. In order to hold the sleeve 7 against movement there is threaded therethrough a small tap screw 8 which engages the bar and thus prevents the sleeve from sliding thereon. It will also be obvious that a clasp finger carried by a sleeve such as is indicated by the numeral 7 may also be mounted upon a metal temple bar as well as upon one of tortoise-shell, or artificial horn.

From the foregoing it will be appreciated that by equipping spectacles with a holding device of the character herein described they may be secured firmly in the breast pocket of a coat or shirt without danger of becoming lost or broken should the wearer thereof lean over so as to invert the pocket.

Having thus described my invention what I claim is:—

1. Securing means for a pair of spectacles, comprising a longitudinally split tubular body designed to receive a temple bar of the spectacles, an elongated resilient tongue extending from one end of the tubular body and bowed outwardly intermediate its ends away from longitudinal center of the body, the free end of the said tongue being designed to resiliently engage the temple bar extending through the tubular body, and a set screw threaded through the tubular body for engagement with the said temple bar.

2. Securing means for a pair of spectacles comprising a longitudinal split tubular body formed to receive a temple bar of the spectacles, an elongated resilient tongue carried by and extending from one end of said body and directed longitudinally thereof, said tongue being transversely bowed outwardly from the longitudinal center of the body, the free end of the tongue resiliently engaging the temple bar extending through the tubular body, and means carried by the tubular body for effecting a tight frictional engagement between it and the temple bar.

In testimony whereof I hereunto affix my signature.

LELAND J. McDONALD.